F. H. WHITE.
ACETYLENE GAS GENERATOR.
APPLICATION FILED JULY 25, 1910.
1,025,352.
Patented May 7, 1912.
2 SHEETS—SHEET 2.
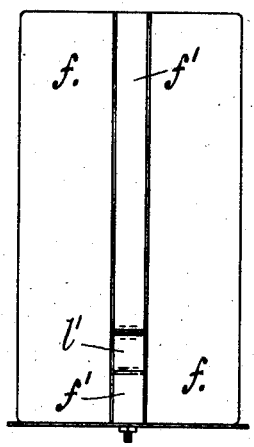
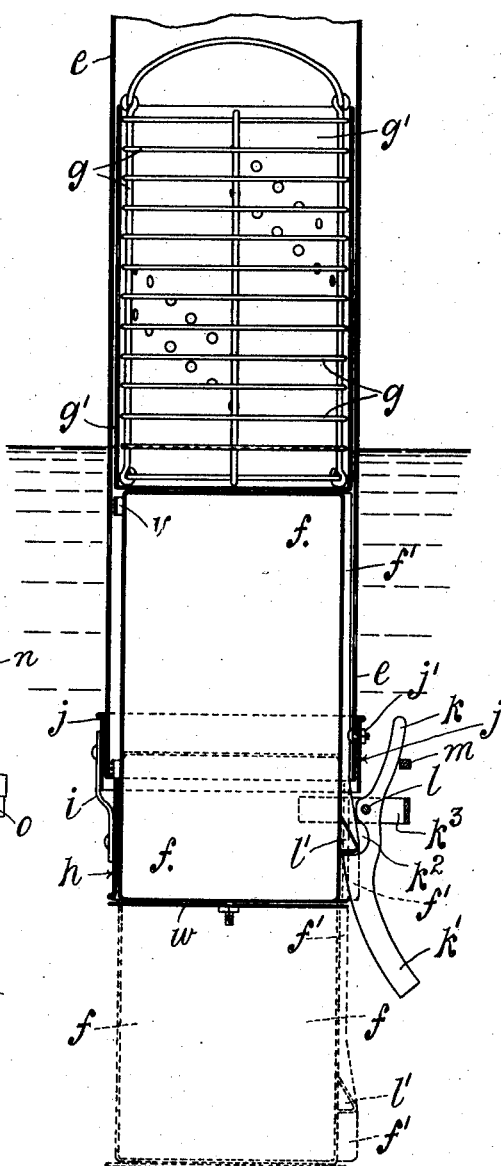
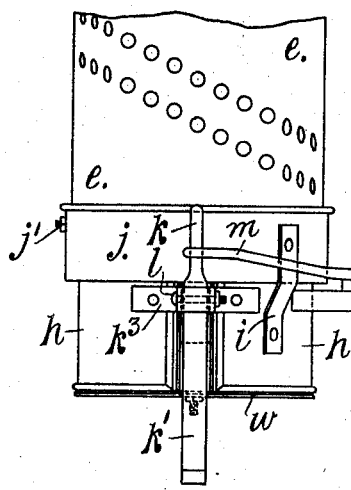
Witnesses
Chas W. Stauffiger
G. M. Shannon.
Inventor
Francis Henry White,
by 
Attorneys.

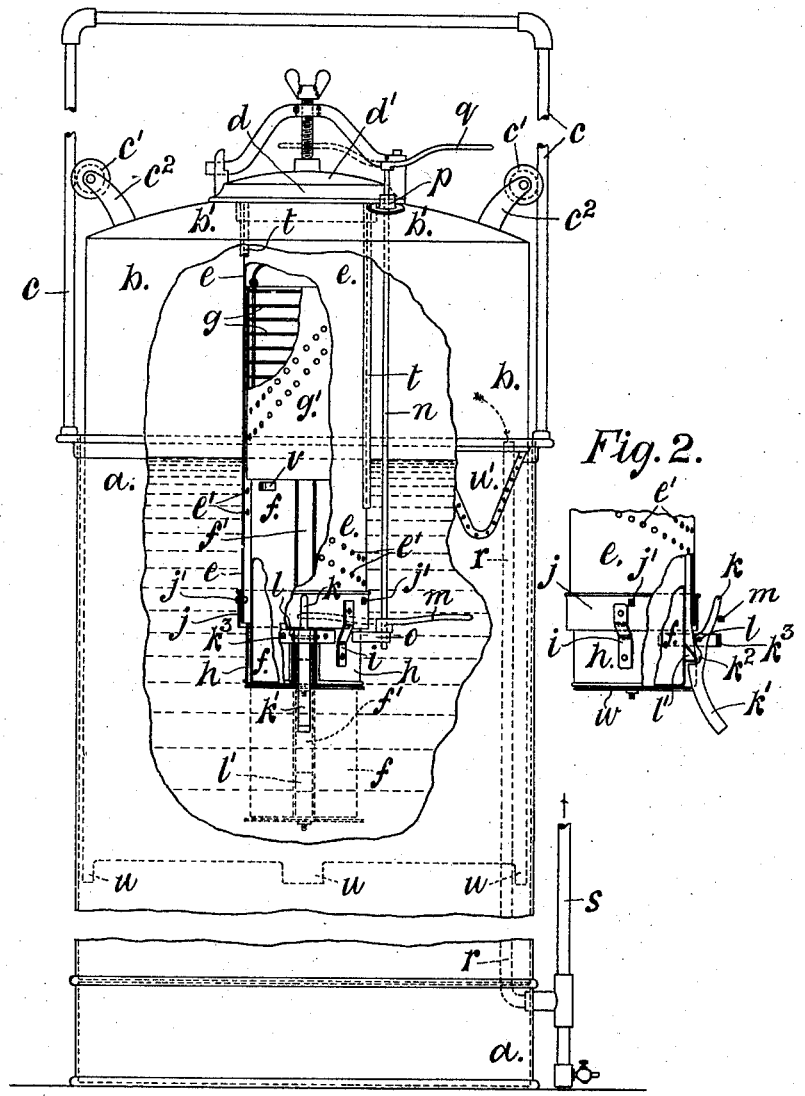

UNITED STATES PATENT OFFICE.

FRANCIS H. WHITE, OF MAGHULL, LIVERPOOL, ENGLAND, ASSIGNOR OF ONE-HALF TO OLIVER HUNTLEY WHITE, OF LIVERPOOL, ENGLAND.

ACETYLENE-GAS GENERATOR.

1,025,352. Specification of Letters Patent. Patented May 7, 1912.

Application filed July 25, 1910. Serial No. 573,680.

*To all whom it may concern:*

Be it known that I, FRANCIS HENRY WHITE, a subject of the King of England, residing at Deyes Lane, Maghull, Liverpool, in the county of Lancaster, England, have invented certain new and useful Improvements in Acetylene-Gas Generators, of which the following is a specification.

This invention relates to acetylene gas generators, and has for its object to porvide apparatus which shall be simple in construction, safe in use, and economical in the amount of calcium carbid used for a given yield of gas.

I provide a cylindrical water tank and an open-bottom gas holder of slightly smaller diameter, which telescopes within said water tank. Secured on the underside of the top of said gas holder (immediately below a removable lid) and, therefore, movable vertically with it, there is provided an open ended cylinder within which is disposed a loose float (preferably in the form of a hermetically sealed sheet metal canister) said float being adapted to support a charge of carbid with container, immersed, more or less in the water. Any suitable container for the carbid may be employed, as, for instance, a wire cage fitted within a perforated sheet metal cylinder. In order to prevent generation of gas by the contact of a fresh charge of carbid with the water before there has been time to secure the cover of the gas holder in position, there is pivoted to the cylinder a pawl or catch which is adapted to automatically engage with said float, say, through a suitable projection on it, when said float has risen in the water, after the spent charge and container have been removed. Then, when a fresh charge of carbid, with container, has been placed upon the float, and the lid firmly secured on the gas holder, said pawl is actuated, to release the float, by means of a suitable rod or lever passing to the outside of the gas holder, by way of a stuffing box, or its equivalent. The weight of carbid charge and container then depresses the float in the water until equilibrium is restored, the buoyancy of the float being so fixed that the lower portion of the charge is immersed. As the charge becomes heavier in weight, the float is depressed in the water still farther, with corresponding increase in the volume of charge immersed. The gas generated passes to an outlet in the water tank through perforations provided in the cylinder and also through the space between the float and inner wall of cylinder; and, in some cases, through pipes communicating with said cylinder, the gas being washed in its passage through the water. Guide rods are attached to said water tank, in contact with which rollers or pulleys connected with the gas holder move up or down according to the varying position of the holder.

In the annexed drawing:—Figure 1 represents an elevation with parts broken away of a gas generating apparatus, embodying the invention. Fig. 2 is an elevation, partly in section, of the float locking mechanism, viewed in plane at right angles to Fig. 1. Fig. 3 is a longitudinal section of the cylinder and float and parts connected therewith. Fig. 4 is an elevation viewed at right angles to Fig. 3, and Fig. 5 is an elevation of the float detached.

$a$ represents the water tank and $b$ the open-bottom gas holder, which telescopes into said water tank $a$.

$c$ are vertical guide rods secured to tank $a$, and $c^1$ are flanged rollers or pulleys supported by brackets $c^2$ which are secured to the crown $b^1$ of gas holder $b$; rollers $c^1$ with rods $c$ form guides for the gas holder $b$ in its vertical movement in relation to tank $a$.

Supported by a lid socket $d$ secured to the crown $b^1$ of gas holder $b$, which socket encircles an aperture in said crown $b^1$ normally closed by a lid or cover $d^1$, is an open ended cylinder $e$ provided with perforations $e^1$, and within said cylinder is disposed a float $f$, upon which is adapted to rest the carbid container, comprising a wire basket $g$ disposed within a perforated casing $g^1$.

$h$ is a band provided at the lower end of cylinder $e$, and connected by straps $i$ to a band $j$, which latter band is, in turn, detachably connected by bolts and nuts $j^1$ to cylinder $e$.

$k$ $k^1$ is a catch lever pivoted on a bolt $l$ which is secured to a strap $k^3$, the latter being attached to band $h$. As illustrated, the recessed portion $k^2$ of arm $k^1$ has moved, under the action of gravity, into engagement with a projection $l^1$ disposed within a longitudinal channel $f^1$ of float $f$.

$m$ is an arm mounted on a vertical spindle $n$, the lower end of which spindle is supported within a socket in the bracket $o$, while the upper end passes through a stuffing box $p$ on the crown $b^1$ of gas holder $b$, and is connected to a handle $q$.

$r$ is a gas pipe disposed within the water receptacle $a$, the mouth of which pipe projects above the water level, and $s$ is an external discharge pipe leading to the place desired.

$t$ are gas pipes, the upper open ends of which are secured to the lid socket $d$, the gas passing to cover $d^1$ having access thereto, while the lower ends usually open below the water level of tank $a$.

$u^1$ is a funnel, by means of which the water is supplied to tank $a$.

In action, when gas is being generated, through the contact of the carbid charge with the water in tank $a$, float $f$ is depressed by the combined weight of the charge and its receptacle $g$, $q^1$, and projection $l^1$ on said float lies below the recess $k^2$ of arm $k^1$, and is therefore out of locking contact with said lever; arm $k^1$, however, lies within the channel $f^1$ and prevents the float from rotation.

As the charge becomes heavier, due to its decomposition the float is depressed still farther, ultimately assuming a position in relation to cylinder $e$, substantially as shown in dotted lines, Fig. 1, and the gas holder rests on its lugs $u$ at the bottom of tank $a$; then, when the charge is removed, and the float is relieved of its weight and also that of its receptacle, said float rises until it assumes the position shown in Figs. 1 and 2, being automatically locked. A fresh charge of carbid is now inserted in cylinder $e$, and placed on the top of float $f$, the cover is replaced and made airtight, and handle lever $q$ is moved to the position shown in dotted lines, Fig. 1, thereby moving arm $m$ to the position indicated by dotted lines Fig. 1, said arm $m$ in its movement, actuating lever $k$ $k^1$ to release the float, which sinks somewhat under the weight of the charge and its container, so that the water is permitted access to the carbid, with the result that gas is generated, and the holder rises within tank $a$.

$v$ is one of two or three stops on the float, which, by engagement with the upper edge of band $h$ limits the downward motion of float $f$, and $w$ is a plate which by engagement with the lower edge of band $h$ limits the upward movement of the float within the cylinder. The gas passes outward through the apertures provided in casing $q^1$, through pipes $t$, and also by way of the space between the inner side of cylinder $e$ and the float $f$, to pipe $r$, being washed by the water in tank $a$.

By mounting the float actuating gear upon band $h$, which in turn is connected with band $j$, said float actuating mechanism and float may be removed for adjustment and repair and replaced with comparative ease.

It is not absolutely essential that cylinder $e$ be perforated, but it is desirable that it be so, in order that the carbid may be decomposed with freedom.

Having now described my invention, what I claim as new and desire to secure by Letters Patent is:—

1. Acetylene gas generating apparatus, comprising a water receptacle and gas holder adapted to telescope therewith, a cylinder connected with said gas holder, a float adapted to support the weight of a charge of calcium carbid disposed within said cylinder, and means for automatically locking said float when said charge is removed from it.

2. Acetylene gas generating apparatus, comprising a water receptacle and gas holder adapted to telescope therewith, a cylinder connected with said gas holder, a float adapted to support the weight of a charge of calcium carbid disposed within said cylinder, means for automatically locking said float when said charge is removed from it, and means for unlocking said float.

3. Acetylene gas generating apparatus, comprising a water receptacle and gas holder adapted to telescope therewith, a cylinder connected with said gas holder, a float adapted to support the weight of a charge of calcium carbid disposed within said cylinder, a projection on said float, a pivotal lever catch adapted to engage said projection and automatically lock said float when said charge is removed from it, and means for actuating said catch to unlock said float.

4. Acetylene gas generating apparatus, comprising a water receptacle and gas holder adapted to telescope therewith, a cylinder connected with said gas holder, a float adapted to support the weight of a charge of calcium carbid disposed within said cylinder, a band detachably connected to said cylinder, a catch pivotally supported on said band, adapted to automatically lock said float when said charge is removed from it, and means for actuating said catch to unlock said float.

5. Acetylene gas generating apparatus, comprising a water receptacle and gas holder adapted to telescope therewith, a cylinder connected with said gas holder, a float adapted to support the weight of a charge of calcium carbid disposed within said cylinder, means for automatically locking said float when said charge is removed from it, means for unlocking said float, and means for limiting the vertical travel of said float in relation to said cylinder.

6. Acetylene gas generating apparatus, comprising a water receptacle and gas holder adapted to telescope therewith, a cylinder connected with said gas holder, a float adapted to support the weight of a charge of calcium carbid disposed within said cylinder, a band, a float locking lever catch pivotally supported on said band, a spindle pivotally supported in a bracket by said band, a catch actuating arm attached to said spindle, and means for detachably connecting said band with said cylinder.

7. Acetylene gas generating apparatus, comprising a water receptacle and gas holder adapted to telescope therewith, a cylinder connected with said gas holder, a float adapted to support the weight of a charge of calcium carbid disposed within said cylinder, a projection on said float, a pivotal lever catch adapted to engage said projection and automatically lock said float when said charge is removed from it, means for actuating said catch to unlock said float, and means for preventing rotation of said float within said cylinder.

8. Acetylene gas generating apparatus, comprising a water receptacle and gas holder adapted to telescope therewith, a cylinder connected with said gas holder, a float adapted to support the weight of a charge of calcium carbid disposed within said cylinder, a band, a float locking lever catch pivotally supported on said band, a spindle pivotally connected with said band, a catch actuating arm attached to said spindle, means for detachably connecting said band with said cylinder, a stuffing box on said gas holder through which said spindle passes, and a handle on said spindle.

9. Acetylene gas generating apparatus, comprising a water receptacle and gas holder adapted to telescope therewith, a cylinder connected with said gas holder, a float adapted to support the weight of a charge of calcium carbid disposed within said cylinder, a longitudinal channel in said float, a projection on said float and within said channel, a pivotal lever catch, an arm of which is adapted to normally lie, under the influence of gravity within said channel and engage said projection when brought in juxtaposition and means for actuating said catch to unlock said float.

10. Acetylene gas generating apparatus, comprising a water receptacle and gas holder adapted to telescope therewith, a cylinder connected with said gas holder, a float adapted to support the weight of a charge of calcium carbid disposed within said cylinder, a longitudinal channel in said float, a projection on said float and within said channel, a band, a float-locking lever catch pivotally supported on said band an arm of which lever is adapted to normally lie within said channel and engage said projection when brought in juxtaposition, means for detachably connecting said band with said cylinder and means for actuating said catch to unlock said float.

In testimony whereof I affix my signature in presence of two witnesses.

FRANCIS H. WHITE.

Witnesses:
JOHN H. WALKER,
H. WILLIAMS.

Copies of this patent may be obtained for five cents each, by addressing the "Commissioner of Patents, Washington, D. C."